(12) United States Patent
Howell et al.

(10) Patent No.: US 9,027,685 B2
(45) Date of Patent: May 12, 2015

(54) LATCH ASSEMBLIES AND CHILDREN'S PRODUCTS THAT INCLUDE LATCH ASSEMBLIES

(71) Applicant: Mattel, Inc., El Segundo, CA (US)

(72) Inventors: William R. Howell, Arcade, NY (US); Christopher G. Gromek, Buffalo, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 14/064,735

(22) Filed: Oct. 28, 2013

(65) Prior Publication Data

US 2014/0265195 A1    Sep. 18, 2014

Related U.S. Application Data

(60) Provisional application No. 61/781,447, filed on Mar. 14, 2013.

(51) Int. Cl.
*B62D 25/12*    (2006.01)
*B62B 9/00*    (2006.01)

(52) U.S. Cl.
CPC .. *B62B 9/00* (2013.01); *B62D 25/12* (2013.01)

(58) Field of Classification Search
CPC ................................ B62D 25/10; B62D 25/12
USPC .............................. 280/79.2; 180/69.2, 69.21
See application file for complete search history.

(56) References Cited

U.S. PATENT DOCUMENTS

| | | |
|---|---|---|
| 999,110 A | 7/1911 | Humphries et al. |
| 2,201,910 A | 5/1940 | Meienborn |
| 2,224,278 A | 12/1940 | Tibbetts |
| 2,233,116 A | 2/1941 | Voorheis |
| 2,460,349 A | 2/1949 | Hessler |

(Continued)

FOREIGN PATENT DOCUMENTS

| | | |
|---|---|---|
| DE | 3700947 A1 | 7/1988 |
| DE | 29701360 U1 | 4/1997 |

(Continued)

OTHER PUBLICATIONS

English-language abstract of French Patent No. 2 571 417 A1, European Patent Office, Apr. 11, 1986.

(Continued)

*Primary Examiner* — Hau Phan
*Assistant Examiner* — Jacob Meyer
(74) *Attorney, Agent, or Firm* — DASCENZO Intellectual Property Law, P.C.

(57) ABSTRACT

Latch assemblies and children's products that include the latch assemblies are disclosed herein. The children's products may include a children's ride-on vehicle. The children's ride-on vehicle may include a vehicle body, a plurality of wheels, and a hinged assembly that is coupled to the vehicle body. The hinged assembly may include a base member, a hinged member, and a latch assembly that is configured to selectively retain the hinged assembly in a closed orientation. The latch assembly may include a female member, a male member that is configured to be selectively interconnected with the female member, and a guide structure. The guide structure may be configured to direct the male member and the female member into an aligned orientation from which the male member may be received within the female member.

20 Claims, 5 Drawing Sheets

(56) References Cited

U.S. PATENT DOCUMENTS

| | | | |
|---|---|---|---|
| 2,484,581 A | 10/1949 | Pallmen | |
| 2,493,874 A | 1/1950 | Hume | |
| 2,534,998 A | 12/1950 | Steinbach | |
| 2,548,492 A | 4/1951 | Rivard et al. | |
| 2,602,266 A | 7/1952 | Preston | |
| 2,631,032 A | 3/1953 | Denker et al. | |
| 2,702,719 A | 2/1955 | Greene, Jr. | |
| 2,733,944 A | 2/1956 | Chvosta | |
| 2,773,715 A * | 12/1956 | Lindner | 292/252 |
| 2,776,160 A * | 1/1957 | Krause | 292/304 |
| 2,794,208 A | 6/1957 | Scroggins | |
| 2,795,450 A * | 6/1957 | Claud-Mantle | 292/304 |
| 3,061,346 A | 10/1962 | Jorgensen | |
| 3,225,856 A | 12/1965 | Caramanna | |
| 3,225,857 A | 12/1965 | De Haan et al. | |
| 3,305,246 A | 2/1967 | Gonezy et al. | |
| 3,338,609 A | 8/1967 | Banas | |
| 3,733,090 A | 5/1973 | Keller | |
| 3,734,551 A | 5/1973 | Hughes et al. | |
| 3,767,001 A | 10/1973 | Chupick | |
| 3,822,501 A | 7/1974 | Kelterstr. 17 | |
| 3,893,207 A * | 7/1975 | Rudaitis et al. | 180/69.21 |
| 3,947,839 A | 3/1976 | Zigmant | |
| 3,964,767 A | 6/1976 | Williams | |
| 4,025,085 A | 5/1977 | Jacobs | |
| 4,040,006 A | 8/1977 | Kimmel | |
| 4,056,275 A | 11/1977 | Keeler, II | |
| 4,122,390 A | 10/1978 | Kollitz et al. | |
| 4,125,170 A | 11/1978 | Botz | |
| 4,173,095 A | 11/1979 | Pauly et al. | |
| 4,204,700 A | 5/1980 | Haines, Sr. | |
| 4,211,428 A | 7/1980 | Barcus | |
| 4,225,004 A * | 9/1980 | Lipshield | 180/89.14 |
| 4,232,910 A | 11/1980 | Snyder | |
| 4,254,998 A | 3/1981 | Marshall et al. | |
| 4,302,866 A | 12/1981 | Irvin | |
| 4,304,066 A | 12/1981 | Brand et al. | |
| 4,366,645 A | 1/1983 | Crain et al. | |
| 4,372,075 A | 2/1983 | Harkins | |
| 4,509,612 A * | 4/1985 | Stuart | 180/89.14 |
| 4,512,483 A | 4/1985 | Crossley et al. | |
| 4,516,948 A | 5/1985 | Obara | |
| 4,556,232 A | 12/1985 | Sever | |
| 4,558,263 A | 12/1985 | Harris et al. | |
| 4,562,893 A | 1/1986 | Cunard | |
| 4,572,312 A | 2/1986 | France et al. | |
| 4,617,001 A | 10/1986 | Parein | |
| 4,627,633 A | 12/1986 | Gehman et al. | |
| 4,700,966 A | 10/1987 | Hawkins et al. | |
| 4,708,683 A | 11/1987 | Lehmann et al. | |
| 4,755,159 A | 7/1988 | Templeton et al. | |
| 4,800,620 A | 1/1989 | Schiemann | |
| 4,824,135 A | 4/1989 | McGregor | |
| 4,824,162 A * | 4/1989 | Geisler et al. | 296/100.09 |
| 4,913,463 A | 4/1990 | Tlapek et al. | |
| 5,042,869 A * | 8/1991 | Brin | 296/121 |
| 5,070,577 A | 12/1991 | Bonneville et al. | |
| 5,111,503 A | 5/1992 | Takagi | |
| 5,136,752 A | 8/1992 | Bening et al. | |
| 5,172,945 A * | 12/1992 | Doherty et al. | 292/49 |
| 5,209,693 A | 5/1993 | Lyman | |
| 5,232,271 A | 8/1993 | Cobble et al. | |
| 5,306,053 A * | 4/1994 | Gurusami et al. | 292/278 |
| 5,394,913 A | 3/1995 | Zezza, Jr. et al. | |
| 5,421,600 A | 6/1995 | Jones et al. | |
| 5,499,855 A * | 3/1996 | Andres et al. | 296/121 |
| 5,558,351 A | 9/1996 | Hunter | |
| 5,570,925 A * | 11/1996 | Cohen | 296/177 |
| 5,644,114 A | 7/1997 | Neaves | |
| 5,859,509 A | 1/1999 | Bienz et al. | |
| 5,924,910 A | 7/1999 | Liu | |
| 5,931,524 A | 8/1999 | Jones, Jr. | |
| 5,947,795 A | 9/1999 | Cohen | |
| 5,951,358 A * | 9/1999 | Hilko et al. | 446/147 |
| 6,179,331 B1 | 1/2001 | Jones et al. | |
| 6,233,784 B1 | 5/2001 | Daoud | |
| 6,243,919 B1 | 6/2001 | Hetland | |
| 6,292,094 B1 | 9/2001 | Deng et al. | |
| 6,338,181 B1 * | 1/2002 | Hwang | 16/266 |
| 6,394,211 B1 * | 5/2002 | Palenchar et al. | 180/69.21 |
| 6,508,320 B2 | 1/2003 | Huntsberger et al. | |
| 6,637,531 B2 * | 10/2003 | Palenchar et al. | 180/69.21 |
| 6,672,936 B1 | 1/2004 | Shaffer | |
| 6,771,034 B2 | 8/2004 | Reile et al. | |
| 6,779,434 B2 | 8/2004 | Hsu | |
| 6,786,795 B1 | 9/2004 | Mullaney et al. | |
| 6,827,164 B2 | 12/2004 | Palumbo et al. | |
| 6,860,512 B2 | 3/2005 | Lawson, Jr. | |
| 6,918,508 B2 | 7/2005 | Hwang | |
| 7,013,530 B2 | 3/2006 | Lallemant | |
| 7,080,754 B2 | 7/2006 | Lown | |
| 7,195,271 B2 * | 3/2007 | Howell et al. | 280/504 |
| 7,228,929 B2 * | 6/2007 | Yiu | 180/69.21 |
| 7,566,090 B2 * | 7/2009 | Baumgartner | 296/121 |
| 7,722,068 B2 | 5/2010 | Michelau | |
| 7,870,972 B2 | 1/2011 | Elefante | |
| 8,662,564 B2 * | 3/2014 | Howell et al. | 296/177 |
| 2002/0158442 A1 | 10/2002 | Harrington | |
| 2006/0006660 A1 * | 1/2006 | Seo | 292/24 |
| 2008/0237252 A1 * | 10/2008 | Elefante | 220/811 |
| 2010/0059968 A1 * | 3/2010 | Asbach et al. | 280/446.1 |
| 2011/0088224 A1 | 4/2011 | Bell | |
| 2011/0121605 A1 * | 5/2011 | Ruby et al. | 296/146.9 |
| 2013/0181589 A1 * | 7/2013 | Howell et al. | 312/326 |

FOREIGN PATENT DOCUMENTS

| | | |
|---|---|---|
| EP | 0044148 A1 | 1/1982 |
| EP | 2385201 A1 | 11/2011 |
| FR | 2 571 417 A1 | 4/1986 |

OTHER PUBLICATIONS

English-language abstract of German Patent No. 3700947 A1, European Patent Office, Jul. 28, 1988.

Estes, Bill, "PullRite: The Ultimate Sway Control," Trailer Life, Dec. 1989, pp. 1-6.

"The PullRite Principle," Pulliam Enterprises, Inc., www.pullrite.com Web site, 1996, pp. 1-2.

"70 Degree PullRite," "90 Degree PullRite," and "Camper Special," www.pullrite.com Web site, 2004, 2 pages.

Tek Nek, "Sesame Fly with Elmo Ride-On," Oct. 2007. Cited in International Search Report issued Apr. 2, 2013 for PCT Patent Application No. PCT/US2013/021148, 8 pages.

English-language abstract of European Patent No. EP 2385201 A1, European Patent Office, Nov. 9, 2011.

* cited by examiner

Fig. 14

LATCH ASSEMBLIES AND CHILDREN'S PRODUCTS THAT INCLUDE LATCH ASSEMBLIES

RELATED APPLICATION

This application claims priority to U.S. Provisional Patent Application Ser. No. 61/781,447, which was filed on Mar. 14, 2013, and the complete disclosure of which is hereby incorporated by reference.

FIELD

The present disclosure relates generally to latch assemblies and more particularly to children's products that include latch assemblies.

BACKGROUND

Children's products come in many shapes and forms and include such products as toys, toy vehicles, children's ride-on vehicles, play sets, play structures, toy tracks, toy chests, etc. Often such children's products include parts that are configured to be repeatedly and selectively interconnected and disconnected. For example, hinged assemblies, such as may be associated with a cavity having a corresponding closure, often include latch assemblies to permit a user to selectively maintain the closure in a closed orientation. Illustrative, non-exclusive examples of hinged assemblies include structures that are associated with hoods, trunks, and/or doors of children's ride-on vehicles and/or other toy vehicles, hinged covers for toy chests, hinged doors, hinged windows, hinged gates of toy play structures, hinged track sets, and the like.

Children's products are intended to be manipulated and operated by children, who may or may not have high dexterity. For example, depending on the age of a child, precise alignment of a latch assembly may not always occur. Moreover, children's products may include mechanisms such as pinch-relief hinges that are specifically configured with slop, or play, so that fingers and/or other body parts are not pinched, for example in a hinged assembly. Such mechanisms inherently restrict regular and precise alignment of associated latch assemblies. Thus, there exists a need for improved latch assemblies and/or for children's products that include the improved latch assemblies.

SUMMARY

Latch assemblies and children's products that include the latch assemblies are disclosed herein. The children's products may include a children's ride-on vehicle. The children's ride-on vehicle may include a vehicle body, a plurality of wheels, and a hinged assembly that is coupled to the vehicle body. The hinged assembly may include a base member, a hinged member, and a latch assembly that is configured to selectively retain the hinged assembly in a closed orientation. The latch assembly may include a female member, a male member that is configured to be selectively interconnected with the female member, and a guide structure. The guide structure may be configured to direct the male member and the female member into an aligned orientation from which the male member may be received within the female member.

In some embodiments, the hinged assembly defines a pinch-relief hinge that is configured to permit limited translation of the hinged member relative to the base member when the hinged member is near the closed orientation. In some embodiments, the limited translation includes translation among a plurality of relative orientations between a pinch-relieving orientation and the closed orientation.

In some embodiments, the guide structure is sized to preferentially direct the male member toward the female member when the hinged member is in each of the plurality of relative orientations. In some embodiments, the guide structure extends from the female member. In some embodiments, the guide structure defines a channel with an open end and a closed end. In some embodiments, the closed end is defined by a partial funnel. In some embodiments, the guide structure includes a divergent wall structure and an open passage along a portion of the divergent wall structure. In some embodiments, the channel defines a longitudinal axis and is sized to permit the male member to translate freely along the longitudinal axis.

In some embodiments, the male member defines an at least partial toroidal shape. In some embodiments, the female member defines a passage that is configured to selectively receive the male member. In some embodiments, the male member has at least one dimension that is greater than a corresponding dimension of the passage. In some embodiments, the female member includes a lip that defines the passage. In some embodiments, the male member is configured to compress relative to the passage when the male member is received by the female member.

DESCRIPTION

Figure 1:
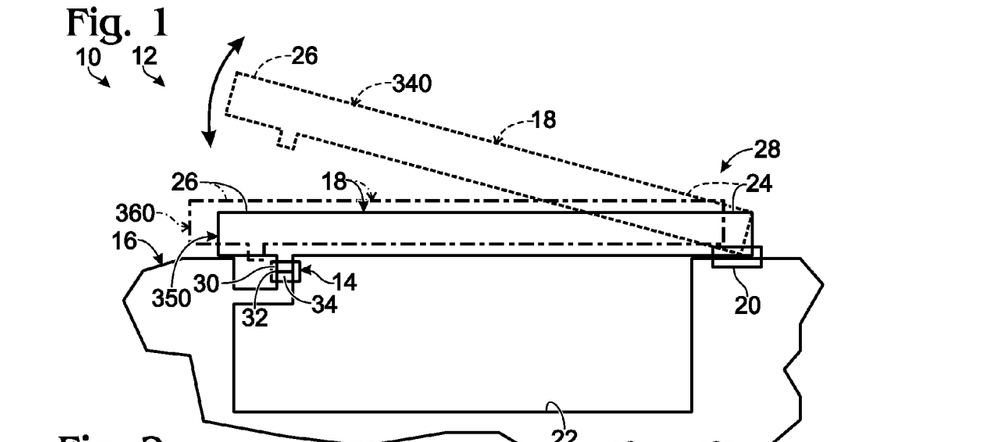
FIG. 1 is a diagram schematically representing illustrative, non-exclusive examples of hinged assemblies and children's products with latch assemblies according to the present disclosure.

Children's products, hinged assemblies, and latch assemblies according to the present disclosure are schematically illustrated in FIG. 1 and are indicated generally at 10, 12, and 14, respectively. Children's products 10 may take any suitable form and may represent any type of children's product that includes a hinged assembly and/or a latch assembly. Illustrative, non-exclusive examples of children's products 10 that may include, incorporate, and/or define hinged assembly 12 and/or latch assembly 14 include (but are not limited to) toys, toy vehicles, children's ride-on vehicles, battery-powered children's ride-on vehicles, play sets, toy play structures, toy tracks, toy chests, children's furniture, children's storage chests, high chairs, toy ovens, etc.

Hinged assemblies 12 include a base member 16 and a hinged member 18 that is operatively and pivotally coupled to the base member. The base member and the hinged member collectively define a hinge 20. As discussed in more detail herein, hinge 20 may be configured to enable pivotal movement between the base member and the hinged member within a range of positions, such as between a closed orientation and a fully open orientation. In some embodiments, the hinge may be a distinct structure that is fastened or otherwise coupled to corresponding portions of the children's product 10 to pivotally couple these portions together. In such an embodiment, hinge 20 may be described as being a separate structure from the corresponding portions of the children's product that it pivotally couples together. However, this construction is not required to all embodiments, as it also is within the scope of the present disclosure that hinge 20 may not be a distinct structure that is separate and apart from one or both of the portions of the children's product that it couples together. In other words, in some embodiments, base member 16 and/or hinged member 18 that form hinge 20 may be structural portions of children's product 10 and not simply a separate accessory that is fastened to portions of the children's product, as is the case with many conventional door and closure hinges. For example, the base member and/or hinge member may be integrally formed with a portion of the children's product.

As schematically illustrated in FIG. 1, base member 16 in some embodiments may define a cavity 22 that selectively is covered and uncovered by the hinged member, but such a configuration is not required to all embodiments. As illustrative, non-exclusive examples, base member 16 may be, may include, and/or may be defined by a toy-vehicle body, and the hinged member may be, may include, and/or may be defined by a hood, a trunk closure, a seat, a battery compartment closure, and/or a door. Other configurations also are within the scope of the present disclosure, and hinged assemblies 12 are not limited to being used with toy vehicles. As a further illustrative, non-exclusive example, toy and/or children's play sets and/or play structures may include a base member 16, such as in the form of a reduced-scale house, a building, a barn, a vehicle, an airplane, a space craft, etc., with at least one hinged assembly 12 that pivotally couples a hinged member 18 thereto, with the hinged member taking the form of such illustrative, non-exclusive forms as a door, a gate, a window, a lid, a storage cover, a case, etc.

Hinged member 18 includes a proximal end region 24 that is operatively coupled to the base member in a pivotal relationship, as schematically illustrated in FIG. 1, and a distal end region 26 that is opposite the proximal end region. The proximal end region additionally or alternatively may be described as the hinged end 24 of the hinged member, and the distal end region additionally or alternatively may be described as the non-hinged end 26 of the hinged member. In FIG. 1, the hinged member is illustrated schematically in solid lines in a closed orientation 350, and in an open orientation 340 in dashed lines, thereby schematically representing that the hinged member is selectively pivotal relative to the base member in a range of positions, as represented by the double arcuate arrow. When the hinged member is in the closed orientation, its distal end region is adjacent to the base member, and when the hinged member is in an open orientation, its distal end region is spaced farther away from the base member than when it is in the closed orientation, or at least farther away from the portion of the base member to which the distal end region is adjacent when in the closed orientation.

In some embodiments of children's products and hinged assemblies according to the present disclosure, and although not required to all embodiments, hinge 20 may be configured to permit not only pivotal movement of the hinged member relative to the base member but also limited translational movement of the hinged member relative to the base member. This optional configuration is schematically illustrated in FIG. 1 with hinged member 18 illustrated in dash-dot lines, and this optional configuration may be referred to herein as a pinch-relieving orientation 360.

In some embodiments, the hinge may be configured to permit this limited translational movement only in a subset of the pivotal range of positions. For example, as the hinged member is pivoted toward the base member (and thus toward its closed orientation), the hinge may permit this limited translational movement, whereas, when the hinged member is pivoted away from the base member relative to the closed orientation, the limited translational movement may be partially or even fully restricted or prevented. Additionally or alternatively, the optional limited transitional movement may be greater toward the closed orientation than toward a fully open orientation of the hinged member.

The limited translational movement also may be described as a limited longitudinal translation. The limited longitudinal translation may occur in a longitudinal direction that is transverse to the axis of rotation, or pivotal axis, of the hinged member. Additionally or alternatively, the limited longitudinal translation may be at least partially aligned with a generally linear channel that may be defined by a guide structure 34, as discussed in more detail herein.

In FIG. 1, the position of the hinged member represented in dash-dot lines is schematically illustrated as being longitudinally translated in a direction away from the hinge; however, it is within the scope of the present disclosure that a hinge may be configured so that there is limited longitudinal translational movement in the opposite direction as well, that is, in the direction generally toward the hinge relative to the distal end region of the hinged member.

Additionally or alternatively, a hinge according to the present disclosure that permits limited translational movement may be described as including slop, or play, in the hinge. Such slop, or play, may be the result of selected manufacturing tolerances. Additionally or alternatively, such slop, or play, may be specifically designed into the hinge to configure the hinge as a pinch-relief hinge 28.

A pinch-relief hinge 28 is a hinge that is configured to prevent, or at least restrict, the pinching of a child's finger or other body part between the hinged member and the base member. This prevention may be accomplished by permitting limited translation of hinged member 18 relative to base member 16 when the hinged member is in, or near, the closed orientation. This limited translation may include translation among a plurality of relative orientations between a pinch-relief orientation 360 and the closed orientation 350. Illustrative, non-exclusive examples of pinch-relief hinges 28 that may be incorporated into a children's product and/or a hinged assembly according to the present disclosure include those disclosed in U.S. Pat. No. 5,570,925, the complete disclosure of which is incorporated herein by reference.

A latch assembly 14 according to the present disclosure includes a male member 30 and a female member 32, which are configured to be selectively interconnected; and guide structure 34 that is configured to facilitate and/or guide the interconnection of the male member and the female member, such as when the male member and the female member are initially misaligned. When a hinged assembly includes latch assembly 14 according to the present disclosure, one of base member 16 and hinged member 18 of hinged assembly 12 may include male member 30 of the latch assembly, while the other of the base member and the hinged member may include female member 32 of the latch assembly. Additionally or alternatively, the male member may be operatively coupled to one of the base member and the hinged member, while the female member may be operatively coupled to the other of the base member and the hinged member.

In examples of hinged assemblies 12 according to the present disclosure that include a hinge that permits limited transitional movement of hinged member 18 relative to the base member 16 (i.e., pinch-relief hinges 28), guide structure 34 of latch assembly 14 may facilitate location of the male member relative to the female member and/or vice versa. That is, and with reference to the dash-dot depiction of hinged member 18 in FIG. 1, when the hinged member is pivoted toward the closed orientation and when the male member and the female member are not initially aligned with each other to permit operative interconnection between the male member and the female member, guide structure 34 of latch assembly 14 may direct motion of the hinged member so that male member 30 and the female member 32 may operatively interconnect. Stated differently, guide structure 34 may aid a user in repositioning the hinged member relative to the base member so that the male member and the female member are appropriately aligned for interconnection of the male member and the female member, such as to latch hinged member 18 to base member 16. Stated yet another way, guide structure 34 may be adapted, configured, designed, and/or sized to preferentially direct male member 30 toward female member 32 when the hinged member is in each of the plurality of relative orientations between pinch-relieving orientation 360 and closed orientation 350.

Male and female members may take any suitable form such that they are configured to be operatively and selectively interconnected to at least temporarily restrict movement of associated structures, such as a hinged member and a base member of a hinged assembly. In some embodiments, the male member and the female member may be configured to be selectively and temporarily interconnected in a snap-fit arrangement and/or in a friction-fit arrangement.

Illustrative, non-exclusive examples of male members 30 include those that define a sphere, a toroidal shape, an at least partial toroidal shape, a torus, a closed torus, an open torus, a hoop, a closed hoop, and/or an open hoop. Illustrative, non-exclusive examples of female members 32 include those that generally define a passage, or a circular passage, that is sized to receive the male member. In some embodiments, the female member may include a lip that defines the passage. In some embodiments, the male member may have at least one dimension that is greater than a dimension of the female member's passage. In some embodiments, the male member may have a cross-sectional area parallel to a plane that is defined by the passage, and the passage may have a cross-sectional area in the plane that is less than the cross-sectional area of the male member.

In some embodiments, the passage may be configured to selectively expand and/or deform in at least one dimension for selective receipt of the male member by the female member. In some embodiments, the male member may be configured to be selectively compressed and/or deformed relative to the female member in at least one dimension for interconnection of the male member and the female member.

Guide structures 34 may take any suitable form and/or construction such that the guide structure facilitates and/or guides the interconnection of the male member and the female member when the male member and the female member are initially misaligned. This may include directing the male member and the female member from a misaligned orientation, in which the male member and the female member are misaligned (such as may occur when pinch-relief hinge 28 is in pinch-relieving orientation 360), to an aligned orientation, in which the male member and the female member are aligned and/or from which the male member may be received within the female member (such as when pinch-relieving hinge 28 is in, or near, closed orientation 350).

The guide structure may be configured to facilitate alignment of the male member and the female member when the male member and the female member initially are misaligned in any suitable direction and/or by any suitable distance. For example, the guide structure may extend from, may be operatively attached to, and/or may be adjacent to one of the male member and the female member, such that the other of the male member and the female member engages the guide structure and permits a user to selectively translate the hinged member relative to the base member, with the guide structure serving to align the male member with the female member, or vice versa. As illustrative, non-exclusive examples, guide structures may include one or more wall, fence, funnel, skirt, cup, ramp, channel, conduit, duct, flange, member, etc. The guide structure may extend near and/or be fixed relative to the male member or the female member. The guide structure additionally or alternatively may extend from and/or form a portion of the male member and/or the female member.

In some embodiments, such as those that include pinch-relief hinge 28, the guide structure may be configured to guide the male member or the female member in a direction corresponding to the limited longitudinal translation of the hinged member. Additionally or alternatively, the guide structure may be configured to restrict movement of the male member or the female member in a direction that is transverse to, or even perpendicular to, the direction corresponding to the limited longitudinal translation of the hinged member.

Figure 2:
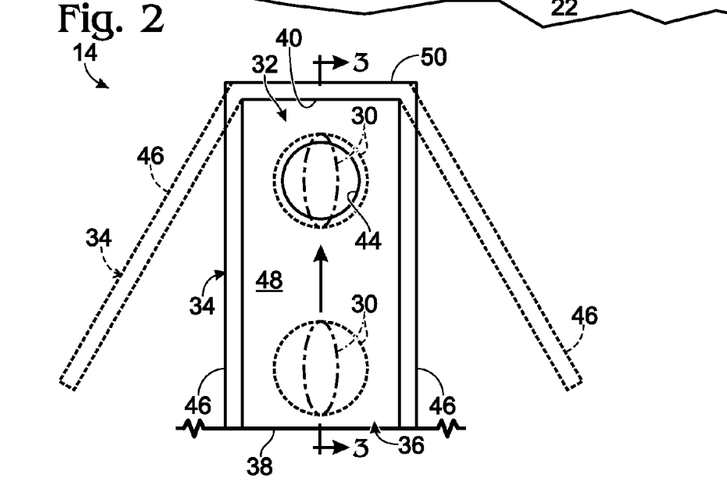
FIG. 2 is a fragmentary schematic plan view diagram representing illustrative, non-exclusive examples of latch assemblies according to the present disclosure.
Figure 3:
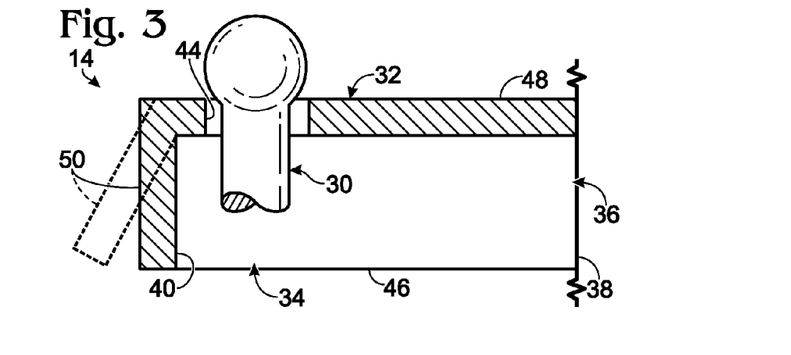
FIG. 3 is fragmentary schematic side view diagram, generally taken along line 3-3 in FIG. 2, schematically representing latch assemblies according to the present disclosure.
Figure 4:
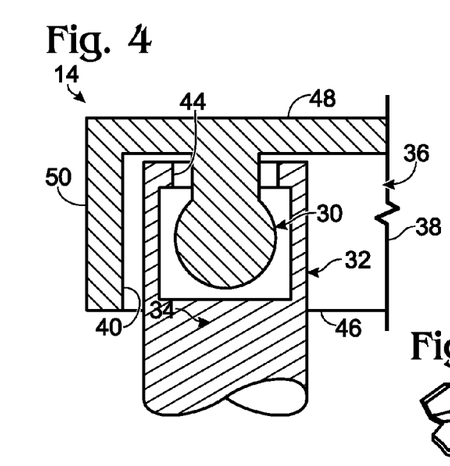
FIG. 4 is another fragmentary schematic side view diagram representing another latch assembly according to the present disclosure.

Turning now to FIGS. 2-4, somewhat less schematic illustrations representing illustrative, non-exclusive examples of latch assemblies 14 are presented. FIG. 2 provides a schematic plan view of a latch assembly, and FIGS. 3 and 4 provide schematic cross-sectional side views of two distinctly configured latch assemblies. The schematic representations of FIGS. 2 and 3 correspond to latch assemblies in which guide structure 34 is fixed relative to female member 32, whereas the schematic representation of FIG. 4 corresponds to a latch assembly in which the guide structure is fixed relative to male member 30.

Referring to FIGS. 2-4, guide structures 34 according to the present disclosure may define a generally linear channel 36 having an open end 38 and a closed end 40. In the example of FIGS. 2-3, the female member defines a passage 44 adjacent to the closed end of the channel, relative to the open end of the channel. Such a configuration permits misalignment of the male member 30 away from the passage along the dimension of the channel. Such a configuration further permits subsequent translation of the male member 30 along the channel until it is properly aligned with the passage, at which point a user may selectively interconnect the male member and the female member. This process of aligning the male member and the female member is schematically illustrated in FIG. 2, with the dashed representation of the male member initially being spaced away from the passage and with the arrow indicating translation of the male member toward and into engagement with the passage.

Conversely, in the example of FIG. 4, male member 30 is fixed relative to the channel adjacent the closed end of the channel. Such a configuration permits misalignment of the female member 32 away from the male member along the dimension of the channel. Such a configuration further permits subsequent translation of the female member along the channel until it is properly aligned with the male member, at which point a user may selectively interconnect the male member and the female member.

As discussed, the male member and the female member may take any suitable form. As schematically illustrated in dashed lines in FIG. 2, and in solid lines in FIGS. 3-4, the male member may have a circular cross-section, such as corresponding to a generally spherical construction. However, as illustrated in dash-dot lines in FIG. 2, it is within the scope of the present disclosure that in cross-section, the male member may have one dimension that is longer than its transverse dimension. In the schematic example of FIG. 2, the optional male member's long dimension aligns with the channel, and the optional male member's short dimension is transverse to the channel; however, such a configuration is not required. A torus-shaped male member is an example of a male member that, in cross-section, includes one dimension that is longer than its perpendicular counterpart dimension. Regardless of the shape of the male member, to interconnect the male member and the female member in a friction-fit or snap-fit arrangement, at least one dimension of the male member is greater than a corresponding dimension of the female member, at least when in a neutral state prior to operative interconnection of the male member and the female member.

Guide structure 34 may include one or more walls, including opposing side walls 46, a base wall 48, and an end wall 50 that collectively define channel 36. In FIG. 2, a generally linear channel is defined by the walls illustrated in solid lines. Such a configuration may permit misalignment of the male member and the female member in only a single dimension, or generally in only a single linear dimension relative to each other. In such embodiments, opposed side walls 46 may be generally parallel to each other. However, as illustrated optionally in dashed lines in FIG. 2, in some embodiments, the opposed side walls 46 of the guide structure may be angled relative to each other, thereby permitting misalignment of the male member and the female member in more than one direction away from each other, while still providing a guide for the male member and the female member to become aligned and selectively interconnected.

In some embodiments, such as illustrated in solid lines in FIGS. 2-4, the opposed side walls 46 and the end wall 50 may be generally orthogonal to each other and perpendicular to the base wall 48, generally defining a regular rectangular prismatic volume of the channel. However, it also is within the scope of the present disclosure that one or more of the opposed side walls 46 and the end wall 50 may be angled, or flared, relative to the base wall 48, such as schematically and optionally represented by dashed end wall 50 in FIG. 3. In some embodiments, the walls may define a funnel, or a partial funnel. In some embodiments, a partial funnel configuration may include angled walls extending in less than 360°, but more than 180°, relative to a central axis of the funnel. Illustrative, non-exclusive examples include 200°-330°, 210°-300°, and 220°-270°, with the remaining portion of this radial dimension being open to permit a structure, such as at least a portion of male member 30, to selectively pass therethrough. Various configurations and angles of walls of guide structures are within the scope of the present disclosure, and the schematic representations of FIGS. 2-4 are not limiting.

In some embodiments, the walls may be described as ramps. In some embodiments, the walls may be described as a divergent wall structure that includes, or defines, an open passage along a portion of the divergent wall structure. In some embodiments, guide structure 34 may extend around at least a portion, or even all, of passage 44.

Guide structure 34 may not be configured to deform when male member 30 is received therein. As an illustrative, non-exclusive example, guide structure 34 may include and/or be a rigid, or at least substantially rigid, guide structure. Alternatively, guide structure 34 may be configured to deform when male member 30 is received therein. As an illustrative, non-exclusive example, guide structure 34 may include and/or be a flexible guide structure.

FIGS. 5-14 provide more specific but still illustrative, non-exclusive examples of children's products 10, children's ride-on vehicles 300, and/or components thereof that may include and/or utilize hinged assemblies 12 and/or latch assemblies 14 according to the present disclosure. It is within the scope of the present disclosure that any of the children's products 10, children's ride-on vehicles 300, latch assemblies 14 and/or components thereof that are discussed herein with reference to any one of FIGS. 5-14 may be included in and/or utilized with any of children's products 10, children's ride-on vehicles 300, and/or latch assemblies 14 of any of FIGS. 1-4. Similarly, it is also within the scope of the present disclosure that any of the children's products 10, children's ride-on vehicles 300, latch assemblies 14, and/or components thereof that are discussed herein with reference to any one of FIGS. 1-4 may be included in and/or utilized with any of the children's products 10, children's ride-on vehicles 300, and/or latch assemblies 14 of and of FIGS. 5-14.

Figure 5:
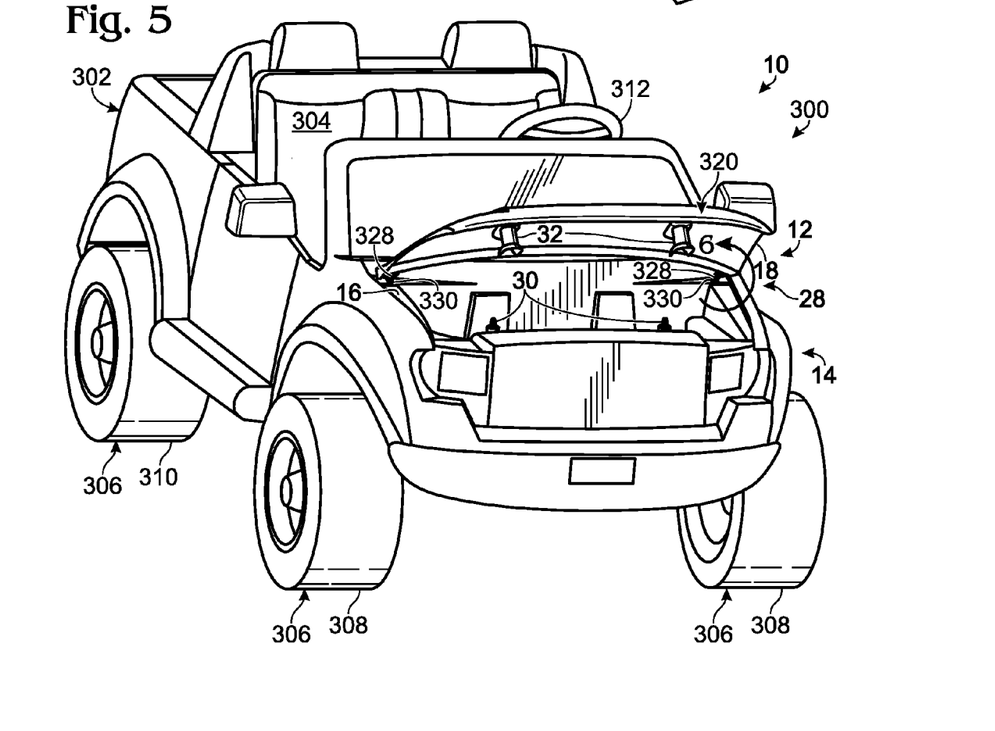
FIG. 5 is a less schematic view of an illustrative, non-exclusive example of a children's ride-on vehicle that may include and/or utilize hinged assemblies and/or latch assemblies according to the present disclosure.

FIG. 5 is an illustrative, non-exclusive example of a children's product 10 in the form of a children's ride-on vehicle 300 that may include and/or utilize latch assemblies 14 according to the present disclosure. Children's ride-on vehicle 300 is an illustrative, non-exclusive example of a children's ride-on vehicle in the form of a four-wheeled vehicle that is configured to resemble a truck.

Children's ride-on vehicle 300 includes one or more hinged assemblies 12, illustrative, non-exclusive examples of which are disclosed herein. As a specific but still illustrative, non-exclusive example, children's ride-on vehicle 300 of FIG. 5 includes a hood 320 that functions as and/or is operatively attached to a hinged member 18 of hinged assembly 12. Children's ride-on vehicle 300 also includes a vehicle body 302, which also may be referred to herein as a body 302. Vehicle body 302 functions as and/or is operatively attached to a base member 16 of hinged assembly 12. A latch assembly 14 may be associated with the operation of hood 320 and/or may be configured to retain hood 320 in a closed configuration, as discussed in more detail herein. Latch assembly 14 may include at least one male member 30 and at least one female member 32, illustrative, non-exclusive examples of which are discussed in more detail herein.

Hinged assembly 12 of children's ride-on vehicle 300 may include and/or be a pinch-relief hinge 28. As discussed in more detail herein, pinch-relief hinge 28 may be configured to permit rotational movement of hood 320 relative to vehicle body 302 and also to permit limited translational movement of hood 320 relative to vehicle body 302, such as to prevent a child from being pinched during opening and/or closing of hood 320.

Figure 6:
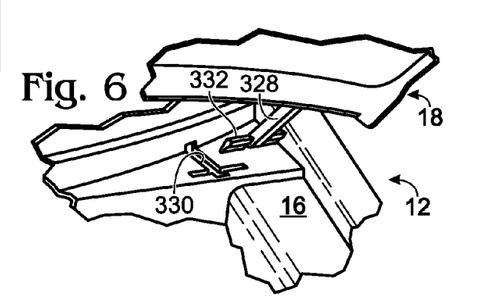
FIG. 6 is a fragmentary exploded view of a portion of the children's ride-on vehicle of FIG. 5 taken along the detail 6 of FIG. 5.

As an illustrative, non-exclusive example, and as illustrated in FIGS. 5-6, pinch-relief hinge 28 may include one or more slots 330 and one or more arms 328. As illustrated, slots 330 may define a T-shape and also may be referred to herein as T-shaped slots 330. Arms 328, which also may be referred to herein as projections 328, may be sized to be received within slots 330 and to slide within slots 330, thereby permitting the limited translational movement of hood 320 relative to vehicle body 302. It is within the scope of the present disclosure that arms 328 and/or slots 330 may have different shapes and/or configurations.

Figure 7:
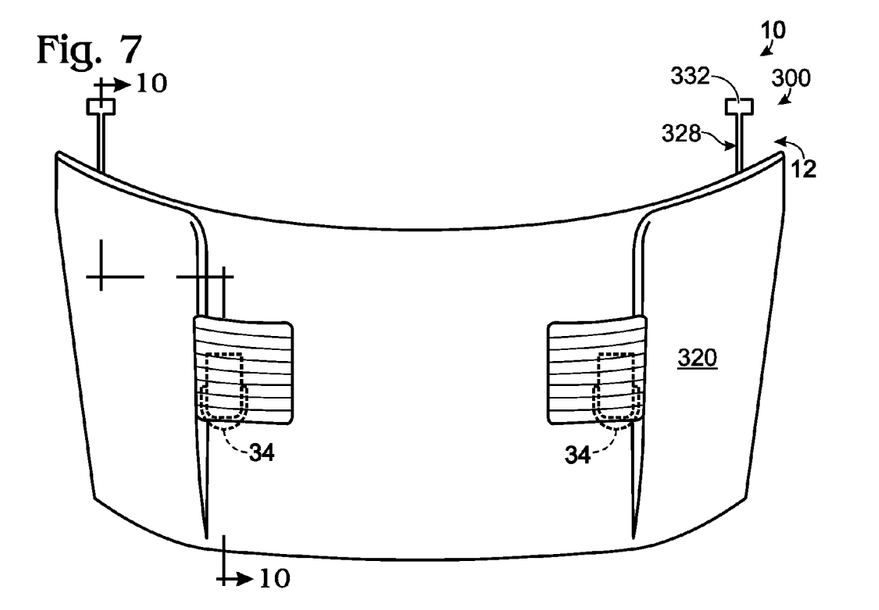
FIG. 7 is a top plan view of the hood of the children's ride-on vehicle of FIG. 5.

As illustrated in FIG. 7, arms 328 may be operatively attached to and/or defined by hood 320. In addition, and as illustrated in FIGS. 6-7, arms 328 may include a tab 332. Tab 332 also may be referred to herein as stop 332 and may be configured to retain arms 328 within slots 330 (shown in FIG. 6). In the illustrative, non-exclusive example of FIGS. 5-7, slots 330 are defined by base member 16 and arms 328 are defined by hinged member 18. However, this is not required in all embodiments. In addition, other pinch-relief hinges also may be included in and/or utilized with children's products 10 according to the present disclosure. Additional illustrative, non-exclusive examples of pinch-relief hinges that may be included in and/or utilized with the systems and methods according to the present disclosure are disclosed in U.S. Pat. No. 5,570,925, the complete disclosure of which is hereby incorporated by reference.

Figure 8:
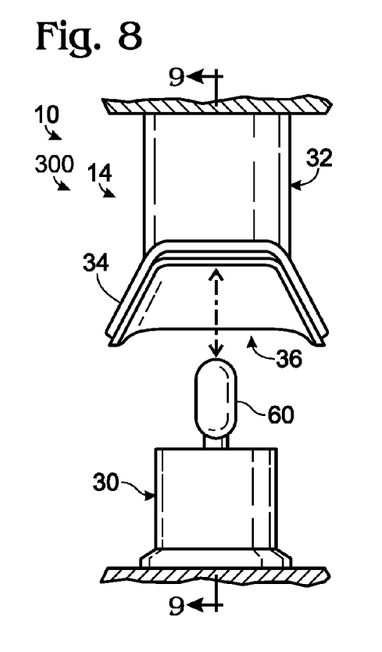
FIG. 8 is a fragmentary elevation view of the latch assembly of FIG. 6.
Figure 9:
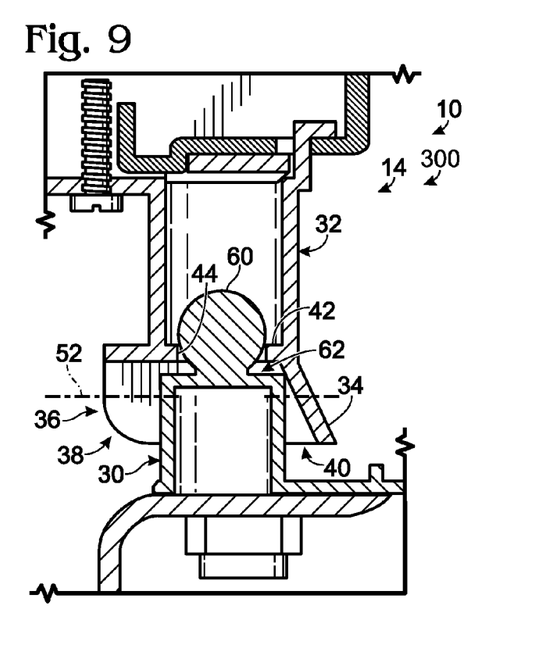
FIG. 9 is a cross-sectional view of the latch assembly of FIG. 8 taken along the line 9-9 in FIG. 8.

FIGS. 8-9 provide less schematic but still illustrative, non-exclusive examples of latch assemblies 14 according to the present disclosure. FIG. 8 is a side view of latch assembly 14, while FIG. 9 is a cross-sectional view taken along line 9-9 of FIG. 8.

In FIGS. 8-9, latch assembly 14 includes a male member 30 and a female member 32. Male member 30 includes a toroidal-shaped region 60 that extends therefrom and is sized to be received by, or within, female member 32. Female member 32 includes a guide structure 34 that defines a channel 36 that includes an open end 38 and a closed end 40 (as illustrated in FIG. 9). Closed end 40 may be referred to herein as defining a partial funnel. Channel 36 defines a longitudinal axis 52, and the channel is sized to permit male member 30 to translate, or translate freely, along longitudinal axis 52.

As perhaps illustrated most clearly in FIG. 9, female portion 32 defines a passage 44 and includes a lip 42 that defines at least a portion of passage 44. Passage 44 and toroidal-shaped region 60 are sized relative to one another such that toroidal-shaped region 60 defines a friction-fit and/or a snap-fit within passage 44. This friction-fit and/or snap-fit may be accomplished through deformation and/or compression of toroidal-shaped region 60, passage 44, and/or lip 42 during insertion of male member 30 into passage 44 of female member 32 (such as during transitioning of latch assembly 14 from the conformation of FIG. 8 to the conformation of FIG. 9 and/or from the conformation of FIG. 9 to the conformation of FIG. 8). As an illustrative, non-exclusive example, toroidal-shaped region 60 may define a recessed region 62 that is sized to interlock with lip 42.

FIGS. 10-13 provide partial schematic cross-sectional views of children's ride-on vehicle 300 of FIG. 5 taken along line 10-10 of FIG. 7 and illustrate the operation of hinged assembly 12 of children's ride-on vehicle 300. Where appropriate, reference numerals from the schematic illustrations of FIGS. 1-14 are used to designate corresponding parts of the illustrated examples; however, the examples of FIGS. 10-13 are non-exclusive and do not limit the present disclosure to the specifically configured examples of these Figures. For the purpose of brevity, each previously discussed component, part, portion, aspect, region, etc., or variants thereof may not be discussed, illustrated, or labeled again with respect to FIGS. 10-13; however, it is within the scope of the present disclosure that the previously discussed features, variants, etc., may be utilized with the examples of FIG. 10-13, or with variants thereof.

Children's ride-on vehicle 300 includes a body 302 and a hood 320. Hinged assembly 12 interconnects body 302 with hood 320 and/or forms a portion of body 302 and/or hood 320. Hinged assembly 12 includes a base member 16 and a hinged member 18 that together form a hinge 20.

Hinge 20 is a pinch-relief hinge 28 that is configured to prevent the pinching of a child's finger or other body part, as discussed herein. Pinch-relief hinge 28 includes a plurality of arms 328 that define a plurality of respective tabs 332 that define at least a portion of hinged member 18. Arms 328 are operatively attached to and/or defined by hood 320 and are sized to be received within slots 330 that may be defined by base member 16. Base member 16 is operatively attached to and/or defined by body 302 of children's ride-on vehicle 300. Additional illustrative, non-exclusive examples of pinch-relief hinge 28 are discussed herein.

Children's ride-on vehicle 300 also includes a latch assembly 14. Latch assembly 14 includes a male member 30 and a female member 32. In the illustrative, non-exclusive examples of FIGS. 10-13, male member 30 is operatively attached to and/or forms a portion of body 302, while female member 32 is operatively attached to and/or forms a portion of hood 320; however, this relative orientation is not required of all embodiments. Illustrative, non-exclusive examples of latch assembly 14 are discussed herein.

Figures 10, 11:
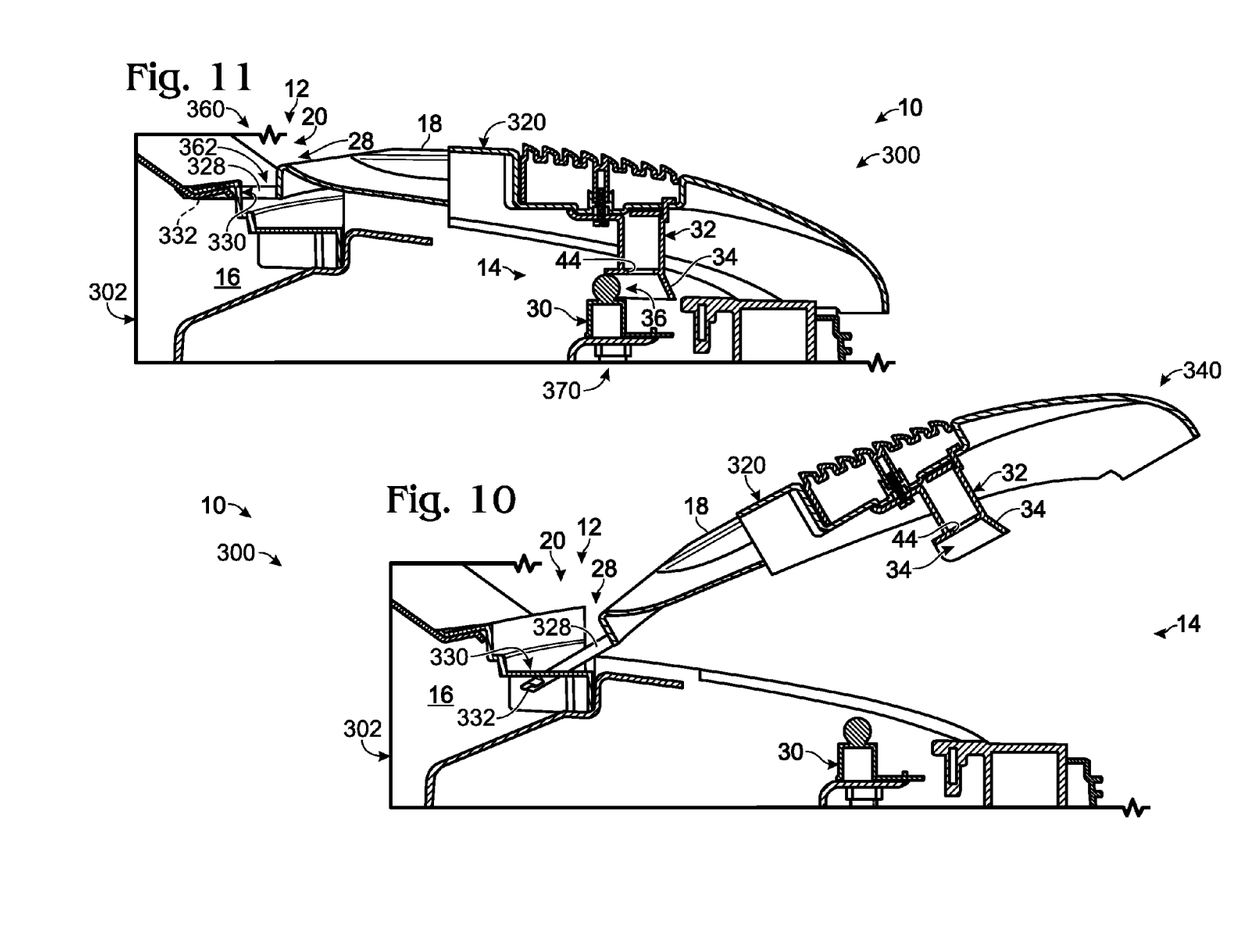
FIG. 10 is a partial schematic cross-sectional view of the children's ride-on vehicle of FIG. 5 taken along line 10-10 and with the hood in an open orientation.
FIG. 11 is a partial schematic cross-sectional view of the children's ride-on vehicle of FIG. 5 taken along line 10-10 in FIG. 7 and with the hood in a pinch-relieving orientation.

Latch assembly 14 further includes a guide structure 34, as discussed in more detail herein. Guide structure 34 is configured to receive male member 30 when pinch-relief hinge 28 is in a pinch-relieving orientation 360 (as illustrated in FIG. 11). Guide structure 34 further is configured to restrict motion of male member 30 relative thereto and/or to direct, or preferentially direct, male member 30 toward a passage 44 that is defined by female member 32.

In FIG. 10, children's ride-on vehicle 300 is illustrated with hood 320 in an open orientation 340. In FIG. 11, hood 320 is near a closed orientation. However, pinch-relief hinge 28 is in a pinch-relieving orientation 360. As such, hood 320 is translated relative to body 302 (such as to the right in the illustrative, non-exclusive example of FIG. 11) to define a gap 362 between body 302 and hood 320 and/or to prevent pinching of a child. This translation of hood 320 relative to body 302 is permitted by latch assembly 14 and places latch assembly 14 in a misaligned orientation 370.

Figure 12:
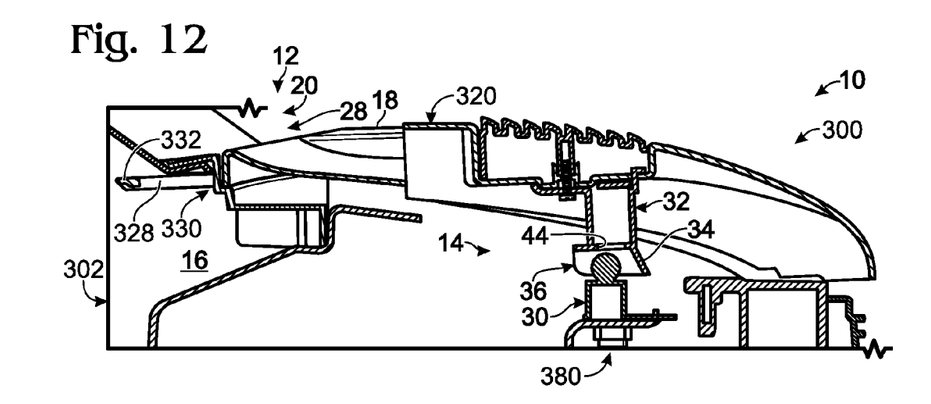
FIG. 12 is a partial schematic cross-sectional view of the children's ride-on vehicle of FIG. 5 taken along line 10-10 in FIG. 7 and with the hood oriented to transition to a closed orientation.
Figure 13:
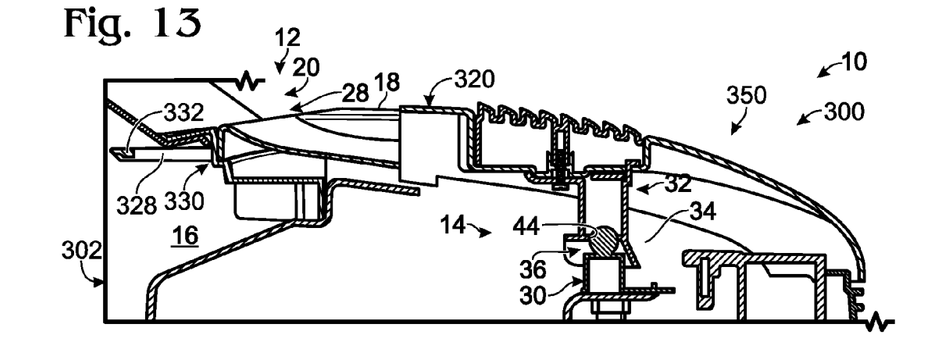
FIG. 13 is a partial schematic cross-sectional view of the children's ride-on vehicle of FIG. 5 taken along line 10-10 in FIG. 7 and with the hood in a closed orientation.

However, and subsequent to receipt of male member 30 within guide structure 34, hood 320 may be directed toward the closed orientation. In the illustrative, non-exclusive example of FIG. 11, this may include moving hood 320 to the left relative to body 302. This may permit male member 30 to align with passage 44 of female member 32 (as illustrated in FIG. 12) and may include translation of male member 30 within guide structure 34 and/or within a channel 36 that is defined by guide structure 34 to an aligned orientation 380. Then, and as illustrated in FIG. 13, at least a portion of male member 30 may be received within female member 32 and/or within passage 44 thereof, thereby selectively retaining hood 320 in a closed orientation 350.

Returning to FIG. 5, children's ride-on vehicle 300 includes a support frame, or body, 302, a child-sized seat 304 that is sized and configured to accommodate at least one child (including a child driver), a plurality of wheels 306 including a pair of steerable wheels 308 and a pair of rear wheels 310, and a steering assembly 312 in the form of a steering wheel, with the steering assembly being operatively coupled to the steerable wheels. In some embodiments, as discussed herein, children's ride-on vehicles according to the present disclosure, including children's ride-on vehicle 300, may include a battery-powered drive system, including at least one motor, in which case the plurality of wheels may include at least one driven wheel, which in some embodiments may be the rear wheels 310. As used herein, the term "driven wheel" refers to a wheel that is rotated directly in response to a rotational input from a drive assembly.

Wheels 306 may be rotatably coupled to vehicle body 302. While children's ride-on vehicle 300 includes four wheels, including two steerable wheels and two rear wheels, which also may be driven wheels, any suitable number of wheels may be included as part of a children's ride-on vehicle according to the present disclosure, including two, three, four, or more than four wheels. Moreover, children's ride-on vehicles according to the present disclosure may be shaped to generally resemble any type of vehicle, including reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like, as well as vehicles that are shaped to resemble fantasy vehicles that do not have a corresponding adult-sized counterpart. Although children's ride-on vehicle 300 is depicted in the form of a four-wheeled truck, the components and/or features of children's ride-on vehicle 300 may be configured for use on and/or with any type of children's ride-on vehicle.

Body 302 typically is formed (at least substantially, if not completely) from molded plastic and may be integrally formed or formed from a plurality of parts that are secured together by screws, bolts, clips, or other suitable fasteners. The body may additionally or alternatively be formed at least partially from other suitable material(s), such as metal, wood, or composite materials. The body may include an underlying frame, or chassis, on which an upper body is mounted. In such an embodiment, the frame often is formed of metal and/or molded plastic, and the upper body often is formed of molded plastic.

Figure 14:
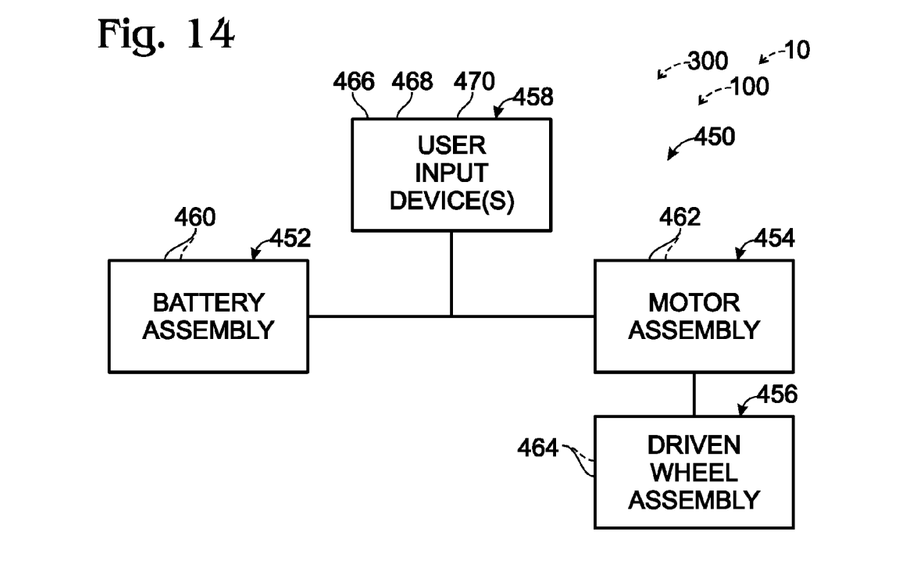
FIG. 14 is a diagram schematically representing battery-powered children's ride-on vehicles, which may include one or more hinged assemblies and/or one or more latch assemblies according to the present disclosure.

Children's ride-on vehicles according to the present disclosure, including children's ride-on vehicle 300, may be (but are not required to be) powered vehicles. FIG. 14 is a diagram schematically representing optional drive assemblies 450 of children's ride-on vehicles, which optionally may include children's ride-on vehicle 300, and which may be a children's product 10. As schematically represented, drive assembly 450 may include battery assembly 452, a motor assembly 454 electrically coupled to the battery assembly, a driven wheel assembly 456 mechanically coupled to the motor assembly, and/or one or more user input devices 458.

Battery assembly 452 may include one or more batteries 460 that are adapted to provide power to the motor assembly. The one or more batteries in the battery assembly may have any suitable construction, and in some embodiments may be rechargeable batteries. Motor assembly 454 includes one or more battery-powered motors 462 that are adapted to drive the rotation of at least one wheel of the driven wheel assembly, which may include one or more driven wheels 464, depending on the configuration of the children's ride-on vehicle.

User input device(s) 458 are adapted to convey inputs from a child seated on the children's ride-on vehicle to the drive assembly. That is, the input device(s) are configured to convey a user's inputs, such as via a wiring harness, to control the actuation of motor assembly 454, such as by causing the actuation (or energizing) of the motor assembly, selecting between a range of electronic configurations, selecting the direction of rotation of the motor assembly's output, selecting the relative degree to which the motor assembly is actuated, etc.

An example of a suitable user input device 458 includes (but is not limited to) a drive actuator 466, through which a user input directing battery assembly 452 to energize the motor assembly may be received. Examples of suitable drive actuators include an on/off switch, a foot pedal, a throttle lever, and/or a rotational handgrip on a steering mechanism that may include a handlebar. Other illustrative, non-exclusive examples of user input devices include a speed switch 468, which also may be referred to herein as a speed control assembly 468 and which may enable a user to select the relative rate of rotation of the motor assembly's output, and a direction switch 470, which may enable a user to select the relative direction or rotation of the motor assembly and thereby selectively configure the children's ride-on vehicle to drive in a forward or reverse direction. When present, the speed switch and/or the direction switch may be located in any suitable location on the body or steering assembly of the children's ride-on vehicle for actuation by a child seated on the seat of the children's ride-on vehicle.

Illustrative, non-exclusive examples of latch assemblies, hinged assemblies, and children's products according to the present disclosure are described in the following enumerated paragraphs:

A1. A latch assembly, comprising:
a female member;
a male member configured to be selectively interconnected with the female member; and
a guide structure configured to direct the male member and the female member from a misaligned orientation to an aligned orientation from which the male member may be received within the female member.

A2. The latch assembly of paragraph A1, wherein the guide structure is fixed relative to the female member, optionally wherein the guide structure extends from the female member, and further optionally wherein the guide structure forms a portion of the female member.

A3. The latch assembly of paragraph A1, wherein the guide structure is fixed relative to the male member, optionally wherein the guide structure extends from the male member, and further optionally wherein the guide structure forms a portion of the male member.

A4. The latch assembly of any of paragraphs A1-A3, wherein the guide structure generally defines a channel.

A5. The latch assembly of any of paragraphs A1-A4, wherein the guide structure generally defines a generally linear channel.

A6. The latch assembly of any of paragraphs A1-A5, wherein the guide structure generally defines a funnel.

A7. The latch assembly of any of paragraphs A1-A6, wherein the guide structure generally defines a partial funnel.

A8. The latch assembly of any of paragraphs A1-A7, wherein the guide structure includes a divergent wall structure and an open passage along a portion of the divergent wall structure.

A9. The latch assembly of any of paragraphs A1-A8, wherein the guide structure generally defines a generally linear channel with an open end and a closed end.

A10. The latch assembly of paragraph A9, wherein the closed end generally defines a funnel, optionally a partial funnel, optionally wherein the closed end is generally flared.

A11. The latch assembly of any of paragraphs A1-A10, wherein the guide structure is at least substantially rigid, and optionally wherein the guide structure is rigid.

A12. The latch assembly of any of paragraphs A1-A11, wherein the guide structure is not configured to deform during receipt of the male member into the female member.

A13. The latch assembly of any of paragraphs A1-A12, wherein the guide structure is configured to facilitate interconnection of the male member and the female member when the male member and the female member are initially misaligned prior to interconnection of the male member and the female member.

A14. The latch assembly of any of paragraphs A1-A13, wherein the male member generally defines a sphere.

A15. The latch assembly of any of paragraphs A1-A13, wherein the male member generally defines a torus, optionally wherein a long dimension of the torus is generally aligned with a long dimension of the guide structure, optionally wherein a long dimension of the torus is generally transverse to a long dimension of the guide structure.

A16. The latch assembly of any of paragraphs A1-A13, wherein the male member generally defines a closed torus.

A17. The latch assembly of any of paragraphs A1-A13, wherein the male member generally defines an at least partial toroidal shape.

A18. The latch assembly of any of paragraphs A1-A13, wherein the male member generally defines a hoop, optionally a closed hoop.

A19. The latch assembly of any of paragraphs A1-A18, wherein the female member generally defines a passage configured to selectively receive the male member.

A20. The latch assembly of paragraph A19, wherein the passage is generally circular.

A21. The latch assembly of any of paragraphs A19-A20, wherein the male member has at least one dimension that is greater than a corresponding dimension of the passage, and optionally wherein the male member has a cross-sectional area parallel to a plane defined by the passage, and further optionally wherein the passage has a cross-sectional area in the plane that is less than the cross-sectional area of the male member.

A22. The latch assembly of any of paragraphs A19-A21, wherein the passage is configured to selectively expand in at least one dimension for selective receipt of the male member by the female member.

A23. The latch assembly of any of paragraphs A19-A22, wherein the female member includes a lip that defines the passage.

A24. The latch assembly of any of paragraphs A19-A23, wherein the guide structure extends around at least a portion of, and optionally the entirety of, the passage.

A25. The latch assembly of any of paragraphs A19-A24, wherein the male member is configured to compress relative to the passage when the male member is received by the female member.

A26. The latch assembly of any of paragraphs A1-A25, wherein the male member and the female member are configured to be selectively interconnected in a snap-fit arrangement.

A27. The latch assembly of any of paragraphs A1-A26, wherein the male member and the female member are configured to be selectively interconnected in a friction-fit arrangement.

A28. The latch assembly of any of paragraphs A1-A27, wherein the male member is configured to be selectively compressed relative to the female member for selective interconnection of the male member and the female member.

A29. The latch assembly of any of paragraphs A1-A28, wherein the male member is configured to be deformed during interconnection of the male member and the female member.

A30. The latch assembly of any of paragraphs A1-A29, wherein the female member defines a/the passage that is configured to receive the male member, wherein the guide structure extends from the female member, wherein the guide structure defines a/the channel with an/the open end and a/the closed end, and further wherein the closed end is defined by a/the partial funnel.

A31. The latch assembly of paragraph A30, wherein the channel defines a longitudinal axis, and further wherein the channel is sized to permit the male member to translate freely therewithin along the longitudinal axis.

A32. The latch assembly of any of paragraphs A30-A31, wherein the female member includes a/the lip that defines at least a portion of the passage.

A33. The latch assembly of paragraph A32, wherein the male member defines a recessed region that is sized to interlock with the lip of the female member when the male member is received within the female member.

B1. A hinged assembly, comprising:
a base member;
a hinged member, wherein the base member and the hinged member collectively define a hinge; and
the latch assembly of any of paragraphs A1-A33.

C1. A hinged assembly, comprising:
a base member; and
a hinged member, the hinged member including:
a proximal end region operatively coupled to the base member in a pivotal relationship; and
a distal end region opposite the proximal end region; and
the latch assembly of any of paragraphs A1-A33, wherein one of the base member and the hinged member includes the female member and the other of the base member and the hinged member includes the male member;
wherein the base member and the hinged member collectively define a hinge, wherein the hinged member is selectively pivotal relative to the base member in a range of positions that include a closed orientation, in which the distal end region is adjacent to the base member and in which the male member and the female member are interconnected, and an open position, in which the distal end region is spaced farther away from the base member than when the hinged member is in the closed orientation.

D1. The hinged assembly of any of paragraphs B1-C1, wherein the hinge defines a pinch-relief hinge, optionally wherein the hinge is configured according to U.S. Pat. No. 5,570,925.

D2. The hinged assembly of any of paragraphs B1-D1, wherein the hinge is configured to permit limited longitudinal translation of the hinged member relative to the base member.

D3. The hinged assembly of paragraph D2, wherein the limited longitudinal translation is at least partially aligned with the guide structure of the latch assembly.

D4. The hinged assembly of any of paragraphs D2-D3, wherein the limited longitudinal translation is at least partially aligned with a/the generally linear channel that is defined by the guide structure.

D5. The hinged assembly of any of paragraphs D1-D4, wherein the pinch-relief hinge is configured to permit limited translation of the hinged member relative to the base member when the hinged member is in a/the closed orientation, wherein the limited translation includes translation among a plurality of relative orientations between a pinch-relieving orientation and the closed orientation, and further wherein the guide structure is sized to preferentially direct the male member toward the female member when the hinged member is in each of the plurality of relative orientations.

D6. The hinged assembly of any of paragraphs B1-D5, wherein the hinged member includes the female member, and wherein the female member is adjacent to a/the distal end region of the hinged member relative to a/the proximal end region of the hinged member.

D7. The hinged assembly of any of paragraphs B1-D6, wherein the hinged member includes the male member, and wherein the male member is adjacent to a/the distal end region of the hinged member relative to a/the proximal end region of the hinged member.

E1. A children's product, comprising: the hinged assembly of any of paragraphs B1-D7.

F1. A children's product, comprising:
a product body;
a closure; and
the hinged assembly of any of paragraphs B1-D7;
wherein the closure includes the hinged member, and wherein the product body includes the base member.

F2. The children's product of paragraph F1, wherein the product body defines a cavity and wherein the hinged member at least partially covers the cavity when the hinged member is in a/the closed orientation and at least partially uncovers the cavity when the hinged member is in a/the open position.

G1. A children's ride-on vehicle, comprising:
a vehicle body including a seat sized for a child;
a plurality of wheels operatively coupled to the vehicle body; and
the latch assembly of any of paragraphs A1-A33.

H1. A children's ride-on vehicle, comprising:
a vehicle body including a seat sized for a child;
a plurality of wheels operatively coupled to the vehicle body; and
the hinged assembly of any of paragraphs B1-D7.

I1. The children's ride-on vehicle of any of paragraphs G1-H1, further comprising:
at least one of a hood, a door, a trunk closure, a seat, a battery cover, or a compartment cover, wherein the at least one of a hood, a door, a trunk closure, a seat, a battery cover, or a compartment cover includes the hinged member, and the vehicle body includes the base member.

I2. The children's ride-on vehicle of any of paragraphs G1-I1, wherein the plurality of wheels is rotatably coupled to the body.

I3. The children's ride-on vehicle of any of paragraphs G1-I2, wherein the plurality of wheels includes at least one driven wheel and at least one steerable wheel.

I4. The children's ride-on vehicle of paragraph I3, further comprising:
a steering assembly comprising a steering mechanism adapted to receive steering inputs from a child sitting on the at least one seat and a steering linkage adapted to convey the steering inputs to the at least one steerable wheel.

I5. The children's ride-on vehicle of any of paragraphs I3-I4, further comprising:
a drive assembly adapted to selectively drive rotation of the at least one drive wheel.

I6. The children's ride-on vehicle of paragraph I5, wherein the drive assembly comprises:
a motor assembly comprising at least one electric motor; and
a battery assembly adapted to selectively energize the motor assembly.

I7. The children's ride-on vehicle of paragraph I6, wherein the drive assembly further comprises a speed control assembly, and further wherein the battery assembly is adapted to selectively energize the motor assembly responsive to inputs from the speed control assembly.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A children's ride-on vehicle, comprising:
a vehicle body including a seat sized for a child;
a plurality of wheels operatively coupled to the vehicle body; and
a hinged assembly coupled to the vehicle body, the hinged assembly comprising:
a base member;
a hinged member, wherein the base member and the hinged member collectively define a pinch-relief hinge that is configured to permit limited translation of the hinged member relative to the base member when the hinged member is near a closed orientation, wherein the limited translation includes translation among a plurality of relative orientations between a pinch-relieving orientation and the closed orientation; and
a latch assembly configured to selectively retain the hinged member in the closed orientation, the latch assembly comprising:
a female member;
a male member configured to be selectively interconnected with the female member; and
a guide structure configured to direct the male member and the female member into an aligned orientation from which the male member may be received within the female member, wherein the guide structure is sized to preferentially direct the male member toward the female member when the hinged member is in each of the plurality of relative orientations.

2. The children's ride-on vehicle of claim 1, wherein the guide structure is fixed relative to the female member and extends from the female member.

3. The children's ride-on vehicle of claim 1, wherein the guide structure includes a divergent wall structure and an open passage along a portion of the divergent wall structure.

4. The children's ride-on vehicle of claim 1, wherein the guide structure generally defines a generally linear channel with an open end and a closed end.

5. The children's ride-on vehicle of claim 4, wherein the closed end generally defines a funnel.

6. The children's ride-on vehicle of claim 4, wherein the generally linear channel defines a longitudinal axis, and further wherein the generally linear channel is sized to permit the male member to translate freely therewithin along the longitudinal axis.

7. The children's ride-on vehicle of claim 1, wherein the male member generally defines an at least partial toroidal shape.

8. The children's ride-on vehicle of claim 1, wherein the female member generally defines a passage configured to selectively receive the male member.

9. The children's ride-on vehicle of claim 8, wherein the male member has at least one dimension that is greater than a corresponding dimension of the passage.

10. The children's ride-on vehicle of claim 8, wherein the female member includes a lip that defines the passage.

11. The children's ride-on vehicle of claim 8, wherein the male member is configured to compress relative to the passage when the male member is received by the female member.

12. A children's ride-on vehicle, comprising:
a vehicle body including a seat sized for a child;
a plurality of wheels operatively coupled to the vehicle body; and
a hinged assembly coupled to the vehicle body, the hinged assembly comprising:
a base member;
a hinged member, wherein the base member and the hinged member collectively define a hinge; and
a latch assembly configured to selectively retain the hinged member in a closed orientation, the latch assembly comprising:
a female member;
a male member configured to be selectively interconnected with the female member, wherein the female member defines a passage that is configured to receive the male member; and
a guide structure configured to direct the male member and the female member into an aligned orientation from which the male member may be received within the passage, wherein the guide structure extends from the female member, wherein the guide structure defines a channel with an open end and a closed end, and further wherein the closed end is defined by a partial funnel.

13. The children's ride-on vehicle of claim 12, wherein the female member generally defines a passage configured to selectively receive the male member.

14. The children's ride-on vehicle of claim 13, wherein the male member has at least one dimension that is greater than a corresponding dimension of the passage.

15. The children's ride-on vehicle of claim 13, wherein the female member includes a lip that defines the passage.

16. The children's ride-on vehicle of claim 13, wherein the male member is configured to compress relative to the passage when the male member is received by the female member.

17. The children's ride-on vehicle of claim 12, wherein the channel defines a longitudinal axis, and further wherein the channel is sized to permit the male member to translate freely therewithin along the longitudinal axis.

18. The children's ride-on vehicle of claim 12, wherein the hinge defines a pinch-relief hinge.

19. The children's ride-on vehicle of claim 18, wherein the pinch-relief hinge is configured to permit limited translation of the hinged member relative to the base member when the hinged member is in a closed orientation, wherein the limited translation includes translation among a plurality of relative orientations between a pinch-relieving orientation and the closed orientation, and further wherein the guide structure is sized to preferentially direct the male member toward the female member when the hinged member is in each of the plurality of relative orientations.

20. The children's ride-on vehicle of claim 12, wherein the hinge is configured to permit limited longitudinal translation of the hinged member relative to the base member.

\* \* \* \* \*